(12) United States Patent
Keihag

(10) Patent No.: US 8,280,352 B2
(45) Date of Patent: Oct. 2, 2012

(54) HANDLING OF ABSENCE MESSAGES IN A MOBILE NETWORK INFRASTRUCTURE

(76) Inventor: Timo Bo Keihag, Grafikvagen (SE)

( * ) Notice: Subject to any disclaimer, the term of this patent is extended or adjusted under 35 U.S.C. 154(b) by 261 days.

(21) Appl. No.: 12/571,657

(22) Filed: Oct. 1, 2009

(65) Prior Publication Data

US 2010/0093313 A1   Apr. 15, 2010

Related U.S. Application Data

(63) Continuation of application No. PCT/SE2008/000235, filed on Mar. 31, 2008.

(30) Foreign Application Priority Data

Apr. 2, 2007 (SE) .................................. 0700834

(51) Int. Cl.
*H04M 1/725* (2006.01)
(52) U.S. Cl. .................................. 455/412.1; 379/88.18
(58) Field of Classification Search ................ 455/412.1, 455/414.1, 445
See application file for complete search history.

(56) References Cited

U.S. PATENT DOCUMENTS

| 6,493,434 | B1 * | 12/2002 | Desmond et al. | 379/88.17 |
|---|---|---|---|---|
| 6,775,690 | B1 | 8/2004 | Creswell | |
| 7,079,517 | B2 * | 7/2006 | Verkama | 370/338 |
| 2001/0028709 | A1 | 10/2001 | Makela et al. | |
| 2003/0008638 | A1 * | 1/2003 | Worley et al. | 455/413 |
| 2004/0086094 | A1 | 5/2004 | Bosik | |
| 2004/0174966 | A1 * | 9/2004 | Koch | 379/88.22 |
| 2005/0089149 | A1 | 4/2005 | Elias | |
| 2005/0159146 | A1 | 7/2005 | Lee | |
| 2005/0232400 | A1 * | 10/2005 | Visser et al. | 379/88.19 |
| 2005/0271188 | A1 * | 12/2005 | Kraft et al. | 379/88.19 |
| 2006/0177012 | A1 * | 8/2006 | Forney et al. | 379/67.1 |

FOREIGN PATENT DOCUMENTS

KR 20030090817 12/2003
WO 2004075522 9/2004

OTHER PUBLICATIONS

Supplementary European Search Report (attached as 1 page) in connection with Application No. EP 08 72 4154, date of completion of search is Jul. 27, 2010, place of search is The Hague.

* cited by examiner

*Primary Examiner* — Kamran Afshar
*Assistant Examiner* — Joseph Dean, Jr.
(74) *Attorney, Agent, or Firm* — Gesmer Updegrove LLP

(57) ABSTRACT

Method, and computer for handling information messages in a wireless communication infrastructure comprising an information message service and a mobile stations comprising the steps: a) receiving a connection request from one or more mobile stations at a server facility providing the information message service; b) receiving identity information about the one or more mobile stations at the server facility via a server facility interface; c) receiving a recording of a plurality information messages at the server facility; d) receiving information at the server facility indicative of the termination of the recording the plurality of information messages; e) storing the plurality of information messages in a storage space on the server facility and; f) receiving information at the server facility specifying at least one time period which at least one of the information messages recorded should be active; g) playing at least one of the information message recorded when receiving information indicative of a call being made to the one or more stations during the specified time period.

10 Claims, 4 Drawing Sheets

HANDLING OF ABSENCE MESSAGES IN A MOBILE NETWORK INFRASTRUCTURE

PRIORITY INFORMATION

The present application is a continuation of International application Serial No. PCT/SE2008/000235 filed Mar. 31, 2008 that claims priority to Swedish Application Serial No. SE-0700834.5, filed on Apr. 2, 2007. Both applications are incorporated herein by reference in their entireties.

TECHNICAL FIELD

The present invention is related to the field of voice messaging in wireless communication networks.

BACKGROUND OF THE INVENTION

In today's society the cell phone has become one of the most important communication items both for personal and business communication.

Especially when doing business it is of essential value for business partners to be able to reach each other or at least to have some information on the other person's whereabouts and the possible time when that person is going to be reachable by cell phone again.

However, even in non-business related communication, it may sometimes be desirable to know when a relative or friend will be reachable again.

Also, as far as the recipient of the cell phone call is concerned, he or she may not wish to be reachable all the time, but would in some cases want to indicate to the calling party when he or she may be available again.

The means for doing this in today's wireless communication networks are very limited.

In the usual case the user is constrained to record one very general message which usually does not tell details about the person's location or indicates when he or she may be reached again.

Some other voice mail systems are incorporated into a computer program to be downloaded and executed on a smart phone, but the voice mail functionally is lost once the cell phone is switched off.

The present invention aims at obviating at least some of the disadvantages associated with known technology.

SUMMARY OF THE INVENTION

The object of the present invention is achieved by method for handling information messages in a wireless communication infrastructure comprising an information message service, where the method comprises the steps:
a) receiving a connection request from one or more mobile stations at a server facility providing the information message service;
b) receiving identity information about the one or more mobile stations at the server facility via a server facility interface;
c) receiving information at the server facility indicative of a start of a recording of a plurality of information messages;
d) receiving information at the server facility indicative of the termination of the recording of the plurality of information messages,
e) storing of the plurality of information messages in a storage space on the server facility, and;
f) receiving information at the server facility specifying at least one time period during which at least one of the information messages recorded should be active
g) playing at least one of the recorded information messages when receiving information indicative of a call being made to the one or more stations during the specified time period.

The advantage of the method of the present invention is that it provides the subscriber to the information message service with the option to record personalized messages of absence and to define the time when these messages should be active. In this way a calling party trying to reach the subscriber of the information message who is absent can receiver more detailed information about the reasons of absence of the subscriber. At the same time the subscriber can switch of his mobile terminal and still be confident that the calling party is provided with enough information of his whereabouts.

According to another aspect of the present invention the object of the invention is achieved by a mobile station for communication in a wireless network infrastructure comprising a receiver/transmitter combination, a microphone for recording sound files to be stored and used as information messages on a server facility, a storage facility for storing recorded or downloaded sound files or messages to be uploaded to the server facility wherein the mobile terminal also comprises an arrangement for connecting to a server facility providing the information message service, for informing the server facility about the start and termination of the recording of a plurality of sound files and for specifying at least one time period during which at least one of the sound files recorded should be active.

The advantage of such a mobile station is the ease and flexibility with which a subscriber to the information message service can record a plurality of specific information messages and request them to be activated at a specific time while at the same time enjoying the freedom of movement.

According to yet another aspect of the present invention the object of the invention is achieved by a computer program for handling an information message service in a wireless network infrastructure comprising instructions sets for:
a) receiving a connection request from one or more mobile stations at a server facility providing the information message service;
b) receiving identity information about the one or more mobile stations at the server facility via a server facility interface
c) receiving information at the server facility indicative of a start of a recording of a plurality of information messages;
d) receiving information at the server facility indicative of the termination of the recording of the plurality of information messages,
e) storing of the plurality of information messages in a storage space on the server facility,
where the computer program comprises further instruction sets for:
f) receiving information at the server facility specifying at least one time period during which at least one of the information messages recorded should be active
g) playing at least one of the recorded information messages when receiving information indicative of a call being made to the one or more stations during the specified time period.

Naturally, the computer program is especially suited to execute the steps of the method according to the present invention.

These and other advantages will be more readily understood by studying the detailed description below with reference to the accompanying figures.

DETAILED DESCRIPTION OF PREFERRED EMBODIMENTS

Figure 1:
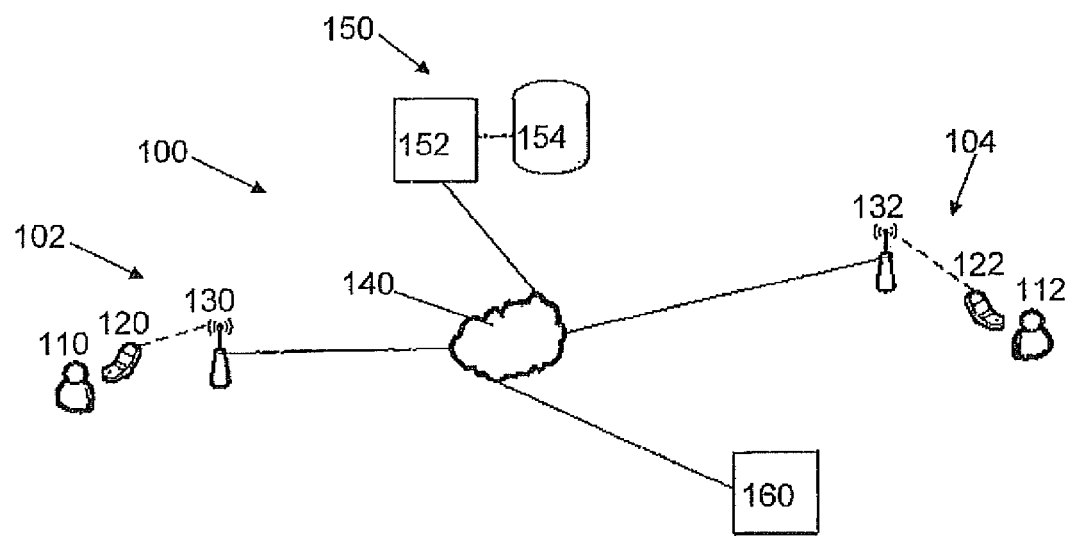
FIG. 1 is an illustration of an example wireless communication infrastructure implementing a first embodiment of the present invention.

FIG. 1 is an illustration of an example wireless communication infrastructure 100 implementing an information message service according to a first embodiment of the present invention.

The wireless communication infrastructure 100 comprises a first wireless communication network 102, which, in turn, comprises a first user 110 using a first mobile station 120, a first base station 130 for receiving data from one or more mobile stations, such as the first mobile station 120 and for transmitting data either to one or more mobile stations in its coverage area (not shown) or to other wireless or wireline communication networks, such as the PLMN (Public Land Mobile Network) 140. Naturally, the first base station 130 is also arranged to receive data from other wireless or wireline communication networks and to transmit it to one or more mobile station in its coverage area, such as the first mobile station 120.

Furthermore, the wireless communication infrastructure 100 comprises a second wireless communication network 104, which, similar to the first wireless communication network 102, comprises a second user 112 using a second mobile station 122 and a second base station 132. Analogously to the first base station 130, the function of the second base station 132 is, among others, to receive data from another wireless or wireline communication network and to send it to one or more mobile station in its coverage area, such as the second mobile station 122. At the same time, the second base station 132 is arranged to receive data from one or more mobile stations, such as the second mobile station 122, in its coverage area and to forward the data either to another wireless communication network, which may be the PLMN 140 in FIG. 1, or to a wireline communication network.

The wireless communication infrastructure 100 also comprises a server facility 150 comprising in this example embodiment a server facility interface 152 for communication with a client, such as the one or more mobile stations 120, 122 and with the PLMN (Public Land Mobile Network) 140. Additionally, the server facility 150 also comprises a database 154 for storing records associated with a subscriber, which may be the first or second user 110, 112, where the records comprise subscriber data and subscriber specific information messages the subscriber uses to indicate his availability as well as the times for the activation and deactivation of the information messages.

The communication between the server facility interface 152 and the clients 120, 122 may be a graphical interface used by the first or second user 110, 112 of the information message service, but also it may be a server facility interface between the PLMN 140 and the server facility 150.

The server facility 150 may, in turn, with the help of the server facility interface 152 for communication with a client and the database 154 activate a certain message based on the telephone number the subscriber is called from.

The PLMN 140 also comprises a mobile functionality 160 which may comprise locating a mobile station to be called and connecting a call or directing a data transmission aimed at the mobile station.

Now, when the first or second user 110, 112, for example, is busy and does not wish or cannot be reached he or she may via its associated mobile station 120, 122 activate one or more information messages which will be heard by other users calling him or her.

The activation of the one or more information messages may be performed by the first or second users 120, 122 by contacting the server 150 via the corresponding first or second base station 130, 132 and the PLMN 140 and using a client interface on its mobile station 120, 122 in order to choose between a number of predefined information message alternatives and the time during which the one or more message should be active. Alternatively, the first or second user 110, 112 may also use its associated mobile station 120, 122 in order to record a personalized information message and store it in the sever database 154 together with the time information specifying the time interval during which the message should be active.

Naturally, the first or second user 110, 112 may activate or record more than one such information message.

Figure 2:
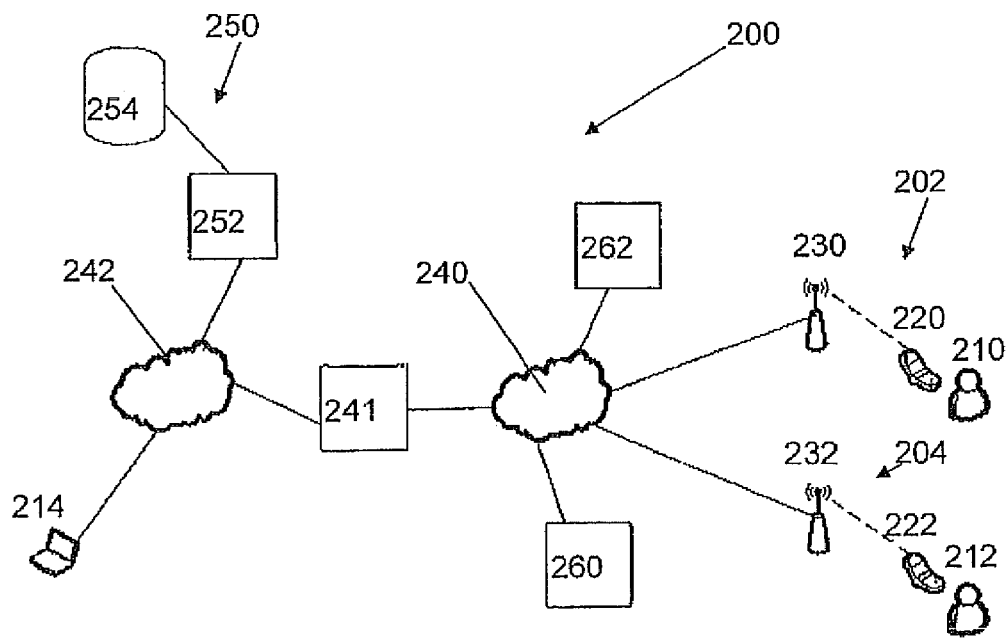
FIG. 2 is an illustration of another example wireless communication network implementing a second embodiment of the present invention.

FIG. 2 is an illustration of another example wireless communication infrastructure 200 implementing a second embodiment of the present invention.

While in the first embodiment of the present invention illustrated in FIG. 1 the server facility 150 was connected to the PLMN and therefore associated to a wireless network operator, the embodiment in FIG. 2 shows a scenario where a server facility 250 is located outside the PLMN 240 allowing for the server facility to be provided independently of any wireless network operator.

Similar to the wireless network infrastructure in FIG. 1, the wireless network infrastructure 200 in FIG. 2 comprises a first wireless communication network 202 and a second wireless communication network 204, which, in turn, comprise a first base station 232 and a first user 212 using a first mobile station 222 in order to communicate with the first base station and a second base station 232, a second user 212 using a second mobile station 222 in order to communicate with the second base station 232.

Similarly to the embodiment in FIG. 1, the wireless network infrastructure 200 comprises a PLMN 240 for communication between the first and the second wireless communication networks 202 and 204, where the mobile communication part is administered by the mobile functionality 260 identical to the mobile functionality 160 in FIG. 1.

Apart from the mobile functionality 260, the PLMN 240 further comprises a voice mail facility 262 which per se is known in wireless communication networks. The PLMN 240 is additionally connected to an IP-network 242, such as the Internet, via a communication node 241.

The function of the communication node 241 is to facilitate communication between the IP-network 242 and the PLMN network 240 by, for example, translating the data protocols used for communication in the two networks 240 and 242. Thus, the communication node 241 may perform the function of a communication gateway.

In a GPRS or UMTS network, for example, this function will usually be performed by a GGSN (Gateway GPRS Support Node) which other functionality is known to the skilled person. However, the present invention is not limited to 2.5G and 3G mobile communication networks, but may work in any wireless communication network.

The wireless infrastructure 250 also comprises a server facility 250 comprising a server facility interface 252 for communication with one of the mobile stations 220, 222 or 214 via the IP-network 242 and a database 254 for storing subscriber records in the same fashion as the earlier described database 154 in FIG. 1.

Apart from the first and second mobile stations 220, 222, a third mobile station 214 may also be used to activate one or more messages indicative of absence by contacting the server facility 250 via the IP-network 242. This may, for example, be performed by connecting to a special webpage stored on the server facility interface 252 in the server facility 250 via which a user (not shown) of the third mobile station may choose one or more messages indicative of his absence by contacting the server facility interface 252. Then that user, which may be identical to the first or second users 210, 212 may via the server facility interface 252 activate one or more messages of absence from the server facility 250.

In this second embodiment, however, the first or second user 210, 212 or some other user communicates with a server facility 250 which is located outside of the PLMN 260 of the wireless network operator.

In this fashion, third party service providers may provide the message of absence service independently of the infrastructure of the PMLN 260 and the condition of the wireless network operator.

At the same time, the third party service provider may for a fee provide download of custom made information messages either from the service facility 250 or some other server facility connected to the IP-network 242.

It may also be mentioned that the client based part of the server facility interface of the server facility may be stored as client software on the first, second or third mobile stations 210, 212 or 214 by either being preinstalled on these mobile stations from the beginning or by being downloadable from either the wireless network operator or some third party service provider directly using the wireless communication network or via a computer connected to a data communication network.

According to FIG. 2 the server facility interface 252 on the server facility 250 is also in communication with the voice mail box 262 belonging to the PLMN 240.

Thus when one of the users 210, 212 wishes to activate one or more messages of absence by communicating with the server facility 250 outside of the PLMN 240, he or she will contact the server facility interface 252 of the server facility 250 either via the PLMN 240 and the IP-network 242 (first and second users 210, 212) or only via the IP-network 242. Then one of the users 210, 212 will activate one or more information messages either from a list of available messages, or by recording a new message of absence and by selecting the time during which the message should be activated.

These one or more messages will then be transferred to the voice mail box 262 in the PLMN 260 and be activated at the user specified time.

Figure 3:
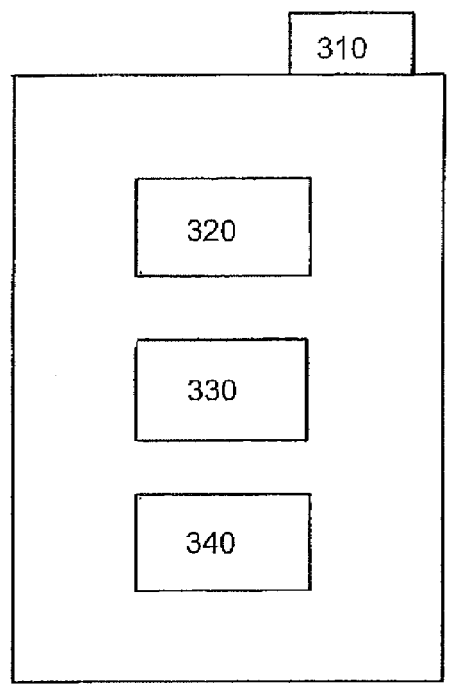
FIG. 3 shows a mobile station according to an embodiment of the present invention.

Turning now to FIG. 3, a mobile station 300 according to the present invention is illustrated in a simplified form. The mobile station 300 according to the present invention comprises a receiver/transmitter combination 310 for communication with a base station, an access node, or some other node in a wireless communication network performing a corresponding function or simply another mobile station. Moreover, the mobile station 300 comprises a microphone 320 for use during a voice call to another user or for recording sounds or messages to be stored and used as information messages on a serves facility, such as the server facility 150 in FIG. 1 or 250 in FIG. 2.

Additionally, the mobile station also comprises a storage facility 330 for storing recorded or downloaded sound files which will be uploaded onto the server facility 150 or 250 and be used there used as information messages. This storage facility 330 may either be an internal RAM (Random Access Memory), a SIM card, an external memory card, a hard disk or some other suitable facility for permanent data storage. It may also store software for operation in the mobile station.

Additionally, the mobile station 300 according to the present invention may comprise a software for providing a service to the subscriber to be able to contact the server facility 150 or 250, to activate one or more messages of absence and the time during which they should be active and additionally a service to record a message of absence and to either store it locally or to directly record it onto the server facility 150 or 250. This software may either be part of an ASIC in the mobile station 300, preinstalled onto the storage facility 330 of the mobile station 300 or be downloadable from a wireless network infrastructure, such as the one in FIG. 2, onto the storage facility 330.

It may be added here, that the mobile station may be any kind of mobile terminal capable of wireless communication with a wireless access point or directly with another mobile station.

Figure 4:
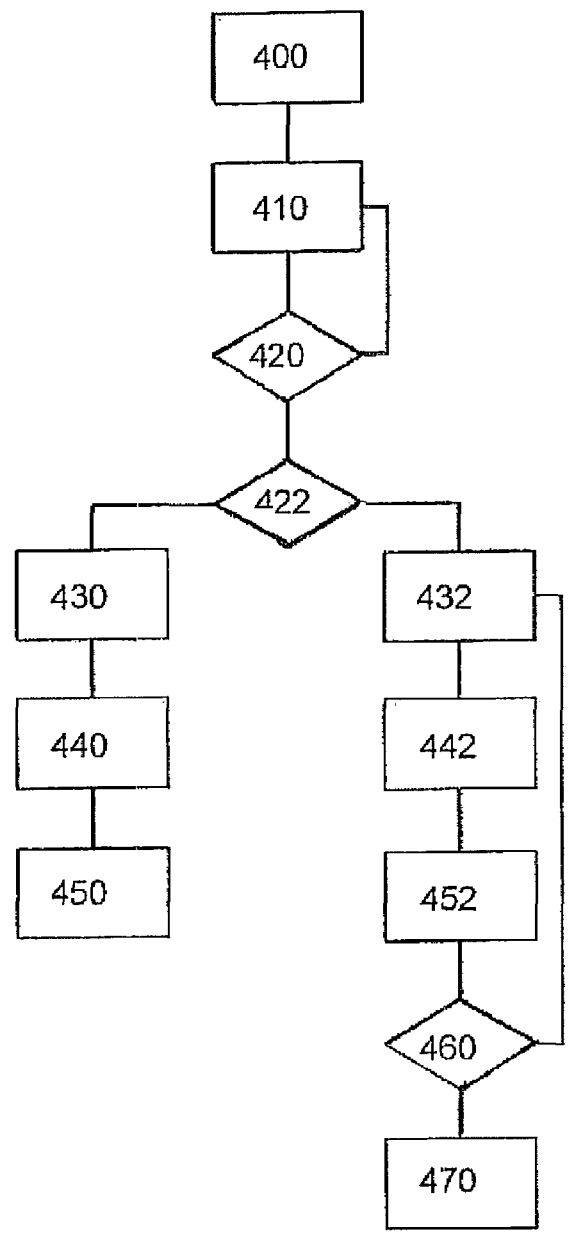
FIG. 4 illustrates the steps for recording or registration of an information message according to an embodiment of a method of the present invention.

Turning now to FIG. 4, an embodiment of the method of the present invention is illustrated, where the steps performed when a user is activating one or more messages of absence are shown. When describing the different method steps reference will be made to users, mobile stations, base stations or access points, servers and the like which have been described previously. However, these references should not be construed as limiting the implementation of the method of the present invention only in such systems. In fact, the method according to the present invention may be implemented in any wireless communication system with client/server functionality, be it a 3G mobile network, a wireless network or any other suitable wireless communication network. The same goes for the description of the method steps in FIG. 5.

Returning now to FIG. 4, a user, such as a first or a second user 110, 112 in FIG. 1 activates at step 400 a so called "multivoice" function on their mobile station and connects to a server facility 150 connected to the PLMN 140. This "multivoice" function is the ability to activate one or more information messages on a server facility and to activate them at a specified time. Naturally, the one or more users may also connect to the server facility via an IP-network in case the server facility is located outside the PLMN.

At step 410, the server facility 150 compares the identity of the mobile station 120, 122 to a list of subscribers stored in a database 154 of the server facility 150. The identity may for example be a number uniquely identifying the mobile station, such as its IMEI number or the identity in the form of a user name and password may be typed in by the user on activation of the "multivoice" service.

If at step 420, the user of the mobile station could not be identified as a valid subscriber, the method returns to step 410, presenting the user with an opportunity to type in his or her user name and password anew. Of course, the server facility 150 may limit the number of login attempts to a certain number after which the "multivoice" service will lock the subscriber's account. Since the further procedure of unlocking account is known to the skilled person and since it is not an essential part of the method according to the present invention, it will not be elaborated on further.

If however, the subscriber identity is found in the subscriber database 152, the user is presented with a choice at step 422 where he or she may choose to either activate one or more information messages, to record an information message or to send a sound file corresponding to the information message to the server facility 150 and to specify the time it should be activated.

Thus, if the user 110 or 112 decides to activate one or more information messages which are already stored in the database 154 of the server facility 150, he or she is presented with a choice of different types of messages of absence at step 430 through a server facility interface 152 of the server facility 150.

In the next step, i.e. at 440, the user selects one or more predefined information messages and specifies the time the one or more messages of absence should be active. Thereafter the "multivoice" interface 152 informs the mobile functionality 160 in the PLMN that the one or more information messages are active.

In the next step, at 450, the mobile functionality 160 of the PLMN 140 confirms the activation of one or more information messages to the mobile terminal 120, 122 and the time they are going to be activated.

Alternatively, if the user 110, 112 selects the option of wanting to record an information message or to send a corresponding sound file to the server facility 150, the server facility 150 at step 432 requests a storage space to be reserved in the database 154 and the database to be ready for recording or receiving a sound file.

Then, at step 442, the data base 154 returns a ready signal to the "multivoice" interface 152 which, in turn, forwards the ready signal to the mobile station 120, 122.

At step 452, the user 110, 112 starts to record a voice message via the mobile station 120, 122 onto the database 154. As already mentioned earlier, the user 120, 122 may also start a transmission of a sound file constituting the information messages to be activated. After the end of the recoding or the end of the transmission of the sound files, the mobile station 120, 122 transmits a termination signal to the multivoice interface 152 which is forwarded to the database 154.

If at step 460 the server facility 150 has successfully received the voice recording or the sound file, the database 154 acknowledges the successful reception to the multivoice interface 152, which, in turn, sends an acknowledgment to the mobile station 120, 122 which sent the sound recoding or sound file.

However, if the sound recording or sound file for some reason was not received correctly, the database 154 transmits a not-acknowledged message to the multivoice interface 152, which forwards the not-acknowledged message to the mobile terminal 120, 122 where the sound recording or sound file originated from.

Alternatively, if the user 110, 112 transmitted a sound file to the database 154 which was not correctly received, the database may keep the part of the file that was correctly received and request a retransmission of the incorrectly received part of that file. Since the assembling together of missing or incorrectly received file parts is known to the skilled person, it will not be further elaborated here.

Figure 5:
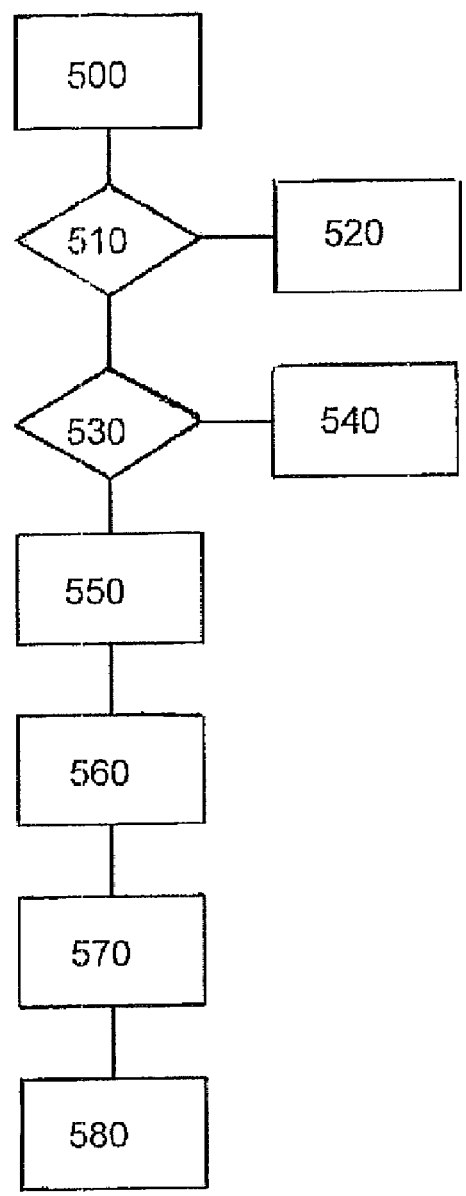
FIG. 5 illustrates the steps executed when a call is made to a mobile station of a user who is not available.

Turning now to FIG. 5, the steps executed when a call is made to a mobile station of a user who is not available are illustrated schematically.

At step 500, a second mobile station, such as the one shown in FIG. 1, i.e. the mobile station 122 calls the multivoice subscriber using the first mobile station 120 by means of the mobile functionality 160 of the PLMN 140.

At step 510, the PLMN 140 checks whether the first mobile station 120 is available and, if yes, the PLMN 140 connects at step 520 via its mobile functionality 160 a call between the second mobile station 122 and the first mobile station 120. Further steps after the call has been connected are omitted here, since they are well known to the skilled person.

Now, if the PLMN 140 via its mobile functionality 140 detects that one first mobile station 120 is not available, it checks at step 530 whether the first user 110 has left any information messages on the server facility 150. If the first user 110 is unavailable, but has not left any information messages the PLMN 140 may at step 540 directly or after a certain waiting time retrieve a standard information message from the database 154 of the server facility 150. This standard information message may contain information on the number the second user 112 has dialed and that he or she may leave a message and/or his or her telephone number as is already known to the skilled person.

If, however the first user 110 has left and activated an information message, then at step 550, the mobile functionality 140 signals the multivoice interface 152 in the server facility 150 to take over the handling of the call made by the second mobile station 122.

In the next step 560, the mobile functionality 140 establishes a voice or sound connection between the multivoice interface 152 and the second mobile station 122.

Thereafter, at step 570, the multivoice interface 152 retrieves the sound file from the database 154 corresponding to the message of absence activated by the multivoice subscriber 110.

Finally, at step 580 the multivoice interface 152 plays the message of absence for the second user 112 using the second mobile terminal 122.

According to one variant (not shown) of the method according to the present invention, the mobile functionality 160 of the PLMN 140 may also transmit the telephone number from which the first user 110 is called to the multivoice interface 152 when redirecting the call.

The multivoice interface 152 may then, depending on the phone number retrieve an information message in the language corresponding to the country from where the call was made or retrieve a telephone number specific information message from the database 154. Whether an information message should have corresponding information in another language or be telephone number specific may be specified by the first user 110 activating or leaving such an information message.

It should be noted that to the skilled person various modification of the present invention will be obvious after having read the description where and that the scope of the invention is only limited by the accompanying claims.

The invention is claimed:

1. A method for handling information messages in a wireless communication infrastructure comprising an information message service, where the method comprises the steps:
   a) receiving a connection request from one or more mobile stations at a server facility providing the information message service;
   b) receiving identity information about the one or more mobile stations at the server facility via a server facility interface;

c) receiving information at the server facility indicative of a start of a recording of a plurality of information messages;
d) receiving information at the server facility indicative of a termination of the recording of the plurality of information messages,
e) storing of the plurality of information messages in a storage space on the server facility, wherein the further steps of
f) receiving information at the server facility, one or more mobile stations specifying at least one time period during which at least one of the information messages recorded should be active
g) playing, at least one of the recorded information messages when receiving information indicative of a call being made to the one or more mobile stations during the specified time period.

2. The method according to claim 1, wherein the server facility is part of a wireless communication network.

3. The method according to claim 2, wherein the communication network is a Public Land Mobile Network, i.e. PLMN, comprising mobile functionality.

4. The method according to claim 1, wherein the server facility is located in a communication network external to PLMN.

5. The method according to claim 3, wherein the recorded information messages are sent via the server facility interface to a voice mail box being part of the PLMN.

6. The method according to claim 1, wherein the identity information comprises one of International Mobile Equipment Identity, i.e. IMEI, user name and/or password, or some other parameter suitable for uniquely identifying the at least one first mobile station.

7. The method according to claim 1, wherein the server facility interface comprises a graphical user interface and/or an interface for communication with a wireless communication network, an IP-network, and one or more mobile stations.

8. The method according to claim 1, wherein the sound file played to the party calling the mobile station depends on the phone number of the calling party.

9. The method according to claim 1, wherein the identity, the recording of the information messages, the information indicative of the termination of the recording or sending the plurality of information messages as well as the time period during which the at least one of the information message recorded should be active are provided by the mobile station.

10. The method according to claim 1, wherein the plurality information messages in step c) comprise sound files.

* * * * *